United States Patent [19]
De Hault et al.

[11] 3,927,039
[45] Dec. 16, 1975

[54] PURIFICATION OF PYROMELLITIC DIANHYDRIDE

[75] Inventors: Emmanuel R. E. G. Draguez Tripels De Hault, Waterloo; Marcel Van Tongelen, Diegem; Henri R. Debus, Meise, all of Belgium

[73] Assignee: Labofina S. A., Brussels, Belgium

[22] Filed: Nov. 1, 1974

[21] Appl. No.: 519,806

[30] Foreign Application Priority Data
Nov. 16, 1973 Belgium .............................. 137812

[52] U.S. Cl. ...................... 260/346.3; 260/346.4
[51] Int. Cl.² ........................................ C07D 307/89
[58] Field of Search ...................... 260/346.3, 346.4

[56] References Cited
UNITED STATES PATENTS
3,338,923   8/1967   Peterlein ........................ 260/346.3

FOREIGN PATENTS OR APPLICATIONS
44-12,134   2/1969   Japan
45-4,050    10/1970  Japan
1,132,784   11/1968  United Kingdom

*Primary Examiner*—Natalie Trousof
*Assistant Examiner*—Bernard I. Dentz

[57] ABSTRACT

A process for purifying pyromellitic dianhydride which comprises treating said dianhydride, containing impurities, with an alkylbenzene solvent having the general formula:

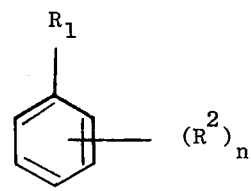

wherein $R_1$ is a saturated aliphatic hydrocarbon radical containing from two to 20 carbon atoms, $R^2$ is a saturated aliphatic radical containing from one to 20 carbon atoms and $n$ is an integer between 0 and 5, the total number of the carbon atoms in $R_1$ and $R_2$ being less than 25, at a temperature between 0° and 280°C, separating the solid pyromellitic dianhydride from the liquid phase which contains alkylbenzene solvent and the impurities, and then evaporating said solvent which is contained in the pyromellitic dianhydride.

9 Claims, No Drawings

PURIFICATION OF PYROMELLITIC DIANHYDRIDE

The present invention relates to a process for purifying pyromellitic dianhydride or the dianhydride of 1,2,4,5 benzene-tetra-carboxylic acid. For the sake of brevity, this dianhydride will be noted hereafter as P.M.D.A.

P.M.D.A. is used for the production of heat resistant plasticizers as a curing agent for epoxy resins, and more particularly, for the manufacture of polyimide resins. These resins are generally prepared by reacting P.M.D.A. with aromatic diamines. They are characterized by excellent mechanical and electrical properties in a wide range of temperatures.

P.M.D.A. is prepared by oxidation of tetraalkylbenzene, especially 1,2,4,5-tetramethylbenzene or durene. P.M.D.A. obtained by catalytic oxidation in vapour phase at high temperature contains pyromellitic acid, tarry products, together with partial oxidation products of the starting tetraalkylbenzene, such as the anhydrides of phthalic, 4-alkylphthalic and 4,5 dialkylphthalic acids.

For the uses of P.M.D.A. described above, particularly for the manufacture of polyimide resins, it is necessary that the degree of purity of the P.M.D.A. be very high. Indeed, the chain length of polyimide resins is unfavorably influenced by the presence of the above referred to partial oxidation products. Moreover, P.M.D.A. must be colorless for technical and commercial reasons.

Several processes have already been proposed for purifying P.M.D.A. Some of these processes need the use of large amounts of selective solvents followed by the recrystallization of P.M.D.A. Other processes are based on the separation of P.M.D.A. out of by-products by complexing the P.M.D.A. with specific components such as indane, tetralin or methylbenzenes, and then recovering P.M.D.A. from the complex. According to a third group of processes, P.M.D.A. is purified by sublimation. All of these processes are relatively expensive and the yield of P.M.D.A. having the desired purity is often low.

It is an object of the present invention to provide a new process for purifying P.M.D.A.

Another object of the present invention is to provide a new process for purifying P.M.D.A. wherein a pure product is recovered with a high yield.

Still another object of the present invention is to purify P.M.D.A. with reduced energy consumption.

A remaining object of the present invention is to provide a new process for purifying P.M.D.A. which requires low amounts of solvent.

According to the present invention, the process for purifying pyromellitic dianhydride consists in treating this pyromellitic dianhydride containing impurities, with an alkylbenzene of general formula:

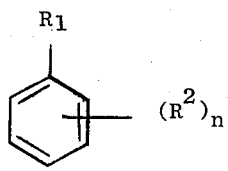

wherein $R_1$ is a saturated aliphatic radical containing from two to 20 carbon atoms, $R_2$ is a saturated aliphatic radical containing from one to 20 carbon atoms and $n$ is an integer between 0 and 5, the total number of carbon atoms of $R_1$ and $R_2$ being less than 25, at a temperature of between 0° and 280°C, separating the solid pyromellitic dianhydride from the liquid phase which contains this alkylbenzene hydrocarbon and the impurities, and then evaporating the solvent contained in the pyromellitic dianhydride.

In the vapor phase catalytic oxidation of tetraalkylbenzenic hydrocarbons to produce P.M.D.A. the products issuing from the oxidation reactor are condensed. Generally, P.M.D.A. is recovered in two successive stages. According to one embodiment, the oxidation reactor is followed by a collector where a first amount of P.M.D.A. is recovered, this collector being itself followed by bag-filters, set in series, where the rest of P.M.D.A. is recovered. In such recovery method, relatively uncontaminated P.M.D.A. is recovered in the first stage, but in the second stage, a less pure P.M.D.A. is recovered than in the first stage.

Several control methods may be used to evaluate the purified product: (a) Acid index or number of milliequivalent acid protons by gram of product. Acid index informs about the elimination of pyromellitic acid and other by-products. Acid index for pure P.M.D.A. is equal to 18.35; (b) Saybolt color, determined by the Saybolt method (ASTM D-156-64) : 100 ml. of caustic soda 0.2N is added to 1 g of product. The color is then estimated and expressed by an index being between + 30 (value of colorless product) and −16 (value of the most colored product). The elimination of tarry products is tested by this method; (c) Variation of the melting point : it is the difference between the initial melting point and the final melting point of P.M.D.A. This variation is low with pure products. For pure P.M.D.A., the variation is about 2°C, the melting point varying between about 284° and 286°C; (d) Viscosity of polymers solution prepared from P.M.D.A. and aromatic diamines. The viscosity of the polymer solution in dimethylformamide increases with P.M.D.A. purity. A minimum viscosity of 1.2 has been set for the polymer prepared from P.M.D.A. having "polymer" quality together with 1,3-diaminobenzene, 0.5 g of this polymer are dissolved into 1 dl dimethylformamide at 30°C.

P.M.D.A. which is directly recovered at the first stage, in the above mentioned collector, generally has the following characteristics:

| | |
|---|---|
| Acid number | : > 18 |
| Saybolt color | : + 10 to + 20 |
| Variation of melting point | : 6 to 10°C |
| Viscosity of the polymer solution | : < 1 |

Although this product somewhat favorably answers to certain tests, it must be submitted to a purification treatment if a good quality polymer is wanted. P.M.D.A. recovered in the second stage, for instance in the bag-filters, generally is less pure than that recovered in the collectors because it only contains about 75% of P.M.D.A., the acid index is less than 18, the color index is less than −16 and the viscosity of the polymer solution is very low. According to the process of the present invention, a very pure P.M.D.A. may be obtained from either of these products.

The present process comprises the treatment of P.M.D.A by a selective solvent for the impurities. This solvent is one having the general formula:

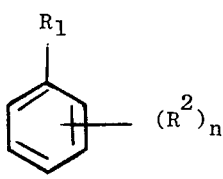

wherein $R_1$ is a saturated aliphatic radical containing from two to 20 carbon atoms, $R_2$ is a saturated aliphatic radical containing from one to 20 carbon atoms, $n$ is an integer between 0 and 5, the total number of carbon atoms of $R_1$ and $R_2$ is less than 25. Non-limiting examples of such solvents which may be used in the process according to the present invention, are monoalkylbenzene, where the normal or branched alkyl radical is the ethyl, propyl, butyl, hexyl, heptyl, dodecyl, tetradecyl, pentadecyl, hexadecyl, heptadecyl, octadecyl and 3-phenylicosane,

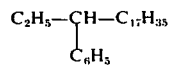

radical. Other solvents include polyalkylbenzenes, wherein at least one alkyl radical contains at least two carbon atoms, such as 1-methyl-3 ethylbenzene, 1,2-dimethyl-4 ethylbenzene, 1,2,3-trimethyl-4 ethylbenzene, 1-methyl-3-isopropylbenzene, p-diisoproplybenzene, 1-methyl-3-butylbenzene, triethylbenzenes, di(-dodecyl) benzenes. The preferred solvent is one that is easily eliminated from P.M.D.A. after treatment.

The choice of the solvent employed depends on economic conditions and on its solubilizing power for the impurities as well as its ease of elimination from the P.M.D.A. According to a preferred embodiment of the present invention, the solvent is one having the hereabove set forth general formula wherein $n$ is an integer between 0 and 2, and more particularly diethylbenzene, is preferably used. Diethylbenzene may be any one of the three isomers or a mixture of the three isomers.

The temperature at which the treatment of P.M.D.A. is performed in accordance with the present invention may vary over a wide range. Such temperature generally is between about 0° and 280°C, preferably between 20° and 220°C, the treatment temperature being at least the melting temperature of the solvent employed. As will be illustrated below, an increase in the temperature is favorable to the present process. However, too high temperatures may induce the formation of tarry products, and therefore, must be avoided. In the preferred embodiment of the invention, where diethylbenzene is used as solvent, the temperature is preferably between 20° and 185°C.

The amount of solvent employed will depend on the nature of the specific solvent and on the amount of impurities which are contained in the P.M.D.A. to be treated. Weight ratios of solvent P.M.D.A. feed which are employed range between 0.5:1 and 50:1. Such ratios are generally between 1:1 and 10:1 for P.M.D.A. obtained by the general oxidation processes of durene in vapor phase.

The contact time between the P.M.D.A. and the solvent may vary over a wide range, such as from 0.1 to 12 hours. The precise time depends on the percentage and the type of impurities which are contained in the P.M.D.A., on the particular solvent used and on the treatment temperature. However, too long a contact time must be avoided because secondary reactions, particularly oxidation reactions, will occur and a degradation of the treated product which becomes brown colored, also may occur. The reaction time which gives the best results may easily be determined by one skilled in the art. Generally, however, contact time is preferred to be between 0.5 and 4 hours, when diethylbenzene is used as a solvent.

The process according to the present invention is performed by using any technique whereby the P.M.D.A. and the solvent are brought into intimate contact. A practically anhydrous solvent preferably is used. This solvent is preferably maintained anhydrous by using a dehydrating agent, preferably in solid form, such as a molecular sieve. When the P.M.D.A. is particularly impure, the solvent treatment may be performed in two or more stages, by using in every stage a solvent as defined hereabove. However, even when P.M.D.A. has a high percentage of impurities, a two-stages treatment generally is sufficient. If desired, the P.M.D.A. may be subjected to a previous wash with a lower aliphatic ketone, especially methyl-ethyl-ketone.

In order to further describe and to illustrate the present invention, the following examples are presented:

EXAMPLES 1 TO 6

In a glass flask with an opening containing anhydrous calcium chloride to avoid the entrance of air humidity, 20 g. of raw P.M.D.A. were treated. This P.M.D.A. had the following characteristics: Acid index, 18.17; Saybolt color, + 17; Variation of melting point, 6°C. The treatment was performed by adding to the glass flask at room temperature with stirring 100 gr of previously dried solvent. This material was added over a period of 2 hours. After the treatment, P.M.D.A. was recovered by filtration and was then dried for 5 hours under vacuum, to eliminate any solvent which was contained in this P.M.D.A. The various solvents employed are listed below and the properties of the P.M.D.A. obtained are given in Table 1 below. The various solvents were:

Experiment 1: ethylbenzene
Experiment 2: p-diethylbenzene
Experiment 3: p-diisopropylbenzene
Experiment 4: 1,3,5-triethylbenzene
Experiment 5: tetradecylbenzene
Experiment 6: mixture of di(dodecyl)benzene isomers Table I

| Experiment | 1 | 2 | 3 | 4 | 5 | 6 |
|---|---|---|---|---|---|---|
| Acid index | 18.25 | 18.22 | 18.26 | 18.25 | 18.24 | 18.23 |
| Saybolt Color | +19 | +23 | +18 | +17 | +18 | +18 |
| Variation of melting T° (°C) | 6 | 6 | 6 | 4.5 | 5.5 | 6 |

Table I-continued

| Experiment | 1 | 2 | 3 | 4 | 5 | 6 |
|---|---|---|---|---|---|---|
| Yield % (a) | 99 | 99 | 99 | 99 | 98.5 | 98 |

(a) recovering rate of P.M.D.A.

EXAMPLE 7

The procedure of Examples 1 through 6 was repeated by using commercial diethylbenzene (mixture of the 3 isomers) as solvent at various temperatures. The results obtained are presented in Table II below:

Table II

| Temperature (°C) | 20 | 120 | 180 |
|---|---|---|---|
| Acid index | 18.22 | 18.24 | 18.27 |
| Saybolt Color | 23 | 18 | 17 |
| Variation of melting T° (°C) | 6 | 6 | 6 |
| Yield | 99 | 98 | 99.5 |

These experiments show that the acid index of P.M.D.A. is improved as the temperature is increased.

EXAMPLES 8 and 9

The procedure of Examples 1 through 6 was again repeated by using commercial diethylbenzene as solvent at 20°C, but with various weight ratios of solvent to impure P.M.D.A. The results of these experiments are presented in Table III below.

Table III

| Experiment | 2 | 8 | 9 |
|---|---|---|---|
| Weight ratio solvent/feed | 5 | 2.5 | 10 |
| Acid index | 18.22 | 18.20 | 18.22 |
| Saybolt color | 23 | 22 | 24 |
| Variation of melting point (°C) | 6 | 6 | 6 |
| Yield | 99 | 99 | 99 |

EXAMPLES 10 AND 11

A soxhlet type apparatus was used. The cartridge, having a capacity of 150 cm³, was filled with 40 g of molecular sieve 5A. Into the flask, diethylbenzene and 20 g of P.M.D.A. were introduced. The P.M.D.A. exhibited the following characteristics: Acid number, 18.17; Saybolt color, + 17; Melting point (°C), 274°-280°; Variation of melting point, 6; Polymer viscosity, 0.56. A magnetic stirrer was used to obtain a suspension of the impure P.M.D.A. into the solvent. The treatment was performed under a stream of pure and dry nitrogen, to avoid saturation of the molecular sieve by air humidity. The solvent was boiled, and the distillation speed was controlled in order that the solvent be siphoned out of the cartridge to the flask, twice an hour. The results of the different experiments are presented in Table IV below.

Table IV

| Experiment | 10 | 11 |
|---|---|---|
| Weight ratio solvent/feed | 6.5 | 25 |
| Temperature, °C | 180-183 | 180-183 |
| Contact time, h. | 4 | 1 |
| Obtained P.M.D.A.: | | |
| Acid index | 18.24 | 18.24 |
| Saybolt color | +13 | +22 |
| Melting point, °C | 270.5-279 | 279-283 |
| Polymer viscosity | 1.5 | 1.9 |

Table IV-continued

| Experiment | 10 | 11 |
|---|---|---|
| Yield (%) | 97.5 | 93.5 |

EXAMPLE 12

P.M.D.A. having the same properties as in Example 1, was treated with commercial diethylbenzene by following in a first stage a procedure such as described in Example 7, with a weight ratio of solvent to P.M.D.A. equal to 3, at a temperature of 100°C for a period of 1 hour. The P.M.D.A obtained was then treated in a second stage by performing a procedure such as described in Example 10, with a weight ratio of solvent to P.M.D.A. equal to 6.5 at a temperature of 180°-183°C for a period of 2 hours. The P.M.D.A. obtained was particularly pure and very suitable for the production of synthetic resins. The viscosity of the resin was equal to 3.4.

EXAMPLE 13

This example describes purification of P.M.D.A. obtained in the second stage condensation of oxidation products. This P.M.D.A. had the following characteristics: Acid index, 16.62; Saybolt color, less than −16; Melting point, 147°-210°C. This P.M.D.A. contained many impurities and it was submitted to a previous wash with an aliphatic lower ketone, namely methylethyl-ketone, for a period of 1 hour at 40°C, by using a weight ratio of solvent to P.M.D.A. equal to 2. After this treatment, the acid index was 16.62 and Saybolt color was higher than +30. This P.M.D.A. was then treated by diethylbenzene by following the procedure described in Examples 10 and 11, by using a weight ratio of diethylbenzene to P.M.D.A. equal to 20 and a treatment time of 3 hours. The resulting P.M.D.A. had the following characteristics: Acid index, 18.22; Saybolt color, higher than +30; Melting point, 282°-284.5; Polymer viscosity, 3.7.

What is claimed is:

1. The process for the purification of impure pyromellitic dianhydride produced from the oxidation of tetraalkyl benzene wherein said purified pyromellitic anhydride exibits the characteristics of having a saybolt color value of at least about 13, an acid index value of at least about 18.20 and a percentage yield based on weight of at least about 93.5%, said process consisting essentially of the steps of:

a. contacting solid impure pyromellitic anhydride with a solvent consisting essentially of an alkyl benzene having the general formula:

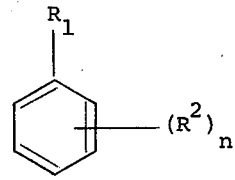

wherein $R_1$ is a saturated aliphatic hydrocarbon radical containing from two to 20 carbon atoms, $R^2$ is a saturated aliphatic radical containing from one to 20 carbon atoms and $n$ is an integer between 0 and 5, the total number of the carbon atoms in $R_1$ and $R^2$ being less than 25, said solvent being selective for said impurities to form a solid phase containing pyromellitic anhydride and a liquid phase containing said alkyl benzene solvent and impurities;

b. separating said solid phase containing purified pyromellitic anhydride from said liquid phase containing said alkyl benzene solvent and impurities; and c. evaporating from said purified pyromellitic dianhydride any residual alkyl benzene remaining therein.

2. The process of claim 1 wherein the pyromellitic dianhydride is contacted with said alkylbenzene solvent at a temperature of between 20° and 220°C.

3. The process of claim 1 wherein said alkylbenzene solvent is one wherein $n$ is between 0 and 2.

4. The process of claim 1 wherein said alkylbenzene solvent is used in an amount corresponding to from 0.5 to 50 times the weight of pyromellitic dianhydride.

5. The process of claim 4 wherein said alkylbenzene solvent is used in an amount corresponding to from 1 to 10 times the weight of pyromellitic dianhydride.

6. The process of claim 1 wherein said alkylbenzene solvent is maintained in a dry state by using a dehydrating agent.

7. The process of claim 6 wherein said dehydrating agent is a molecular sieve.

8. The process of claim 1, further including the step of washing said impure pyromellitic anhydride, as a first step, with a solvent selected from the group consisting of lower aliphatic ketones and alkyl benzenes having the formula

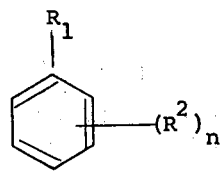

wherein $R_1$ is a saturated aliphatic hydrocarbon radical containing from two to 20 carbon atoms, $R^2$ is a saturated aliphatic radical containing from one to 20 carbon atoms and $n$ is an integer between 0 and 5, the total number of the carbon atoms in $R_1$ and $R^2$ being less than 25.

9. The process of claim 1 wherein the pyromellitic dianhydride is treated with diethylbenzene at a temperature of between 20° and 185°C.

* * * * *